US012088185B2

(12) United States Patent
Huang et al.

(10) Patent No.: US 12,088,185 B2
(45) Date of Patent: Sep. 10, 2024

(54) APPARATUS AND METHOD FOR A VOLTAGE CONVERSION CIRCUIT WITH FEEDBACK CIRCUITRY

(71) Applicant: Huawei Technologies Co., Ltd., Shenzhen (CN)

(72) Inventors: Chen Huang, Chengdu (CN); Qiang Xie, Shenzhen (CN); Liang Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 135 days.

(21) Appl. No.: 17/366,744

(22) Filed: Jul. 2, 2021

(65) Prior Publication Data

US 2021/0336524 A1 Oct. 28, 2021

Related U.S. Application Data

(63) Continuation of application No. PCT/CN2019/070715, filed on Jan. 7, 2019.

(51) Int. Cl.
*H02M 1/00* (2007.01)
*H02M 3/158* (2006.01)

(52) U.S. Cl.
CPC ......... *H02M 1/0025* (2021.05); *H02M 3/158* (2013.01); *H02M 3/1586* (2021.05); *H02M 1/0009* (2021.05)

(58) Field of Classification Search
CPC .... H02M 3/158; H02M 3/156; H02M 3/1566; H02M 3/1563; H02M 1/0025; H02M 1/0009
See application file for complete search history.

(56) References Cited

U.S. PATENT DOCUMENTS

| 7,230,406 | B2 * | 6/2007 | Huang | H02M 3/158 |
| | | | | 323/284 |
| 8,575,911 | B2 * | 11/2013 | Cheng | H02M 3/1588 |
| | | | | 323/283 |
| 9,735,680 | B2 * | 8/2017 | Huang | G01R 19/16585 |
| 9,966,849 | B1 * | 5/2018 | Lin | G05F 1/56 |
| 10,164,536 | B2 | 12/2018 | Huang | |
| 10,177,654 | B1 * | 1/2019 | Chang | H03K 5/24 |

(Continued)

FOREIGN PATENT DOCUMENTS

CN 103023326 A 4/2013
CN 103683889 A 3/2014

(Continued)

*Primary Examiner* — Gustavo A Rosario-Benitez
(74) *Attorney, Agent, or Firm* — James Harrison

(57) ABSTRACT

In a voltage conversion circuit, a sampling signal and a triangular wave signal are synthesized into a first signal, and the first signal and a second signal are compared to output a pulse-width modulation (PWM) signal. A frequency of the PWM signal may be determined by a frequency of the triangular wave signal. Therefore, the frequency of the PWM signal is fixed using the frequency-fixed triangular wave signal. Turning on or switching off of a power transistor in a voltage conversion subcircuit is controlled according to the PWM signal to convert a received direct current input voltage into a direct current output voltage, thereby implementing a fixed operating frequency for the voltage conversion circuit.

20 Claims, 8 Drawing Sheets

(56) References Cited

U.S. PATENT DOCUMENTS

| | | | |
|---|---|---|---|
| 2006/0125454 A1* | 6/2006 | Chen | H02M 3/1588 |
| | | | 323/282 |
| 2007/0247121 A1 | 10/2007 | Wu et al. | |
| 2014/0159689 A1 | 6/2014 | Chen | |
| 2015/0155784 A1* | 6/2015 | Ouyang | H02M 3/1563 |
| | | | 323/285 |
| 2015/0244263 A1 | 8/2015 | Ng et al. | |
| 2015/0277460 A1* | 10/2015 | Liu | G05F 1/56 |
| | | | 323/280 |
| 2015/0378378 A1 | 12/2015 | Zhang et al. | |
| 2016/0006352 A1* | 1/2016 | Hang | H02M 3/158 |
| | | | 323/288 |
| 2018/0062509 A1* | 3/2018 | Duong | H02M 1/08 |
| 2018/0183337 A1 | 6/2018 | Huang | |
| 2019/0165676 A1* | 5/2019 | Nogawa | H02M 3/158 |
| 2019/0229612 A1* | 7/2019 | Chen | H02M 3/158 |

FOREIGN PATENT DOCUMENTS

| | | |
|---|---|---|
| CN | 105048808 A | 11/2015 |
| CN | 105337500 A | 2/2016 |
| CN | 105406713 A | 3/2016 |
| JP | 2004040854 A | 2/2004 |
| JP | 2012016241 A | 1/2012 |

\* cited by examiner

APPARATUS AND METHOD FOR A VOLTAGE CONVERSION CIRCUIT WITH FEEDBACK CIRCUITRY

CROSS-REFERENCE TO RELATED APPLICATIONS

This application is a continuation of International Patent Application No. PCT/CN2019/070715 filed on Jan. 7, 2019, which is hereby incorporated by reference in its entirety.

TECHNICAL FIELD

This application relates to the field of electronic technologies, and in particular, to a voltage conversion circuit.

BACKGROUND

A direct current-direct current (DC-DC) converter is a circuit topology in which a direct current input voltage is converted into a direct current output voltage. Based on a buck/boost characteristic of a system, the DC-DC converter may be classified into several main types such as a boost DC-DC converter, a buck DC-DC converter, and a buck-boost DC-DC converter. The DC-DC converter is widely used in products such as a mobile base station and a consumer terminal.

In an existing mature DC-DC converter, a modulation scheme such as pulse width modulation (PWM) or pulse frequency modulation (PFM) is usually used, such that the DC-DC converter can maintain stable performance when being used under different operating conditions. The PWM modulation scheme of the DC-DC converter is further divided into a voltage-mode control manner, a current-mode control manner, and a hysteresis-mode control manner. A current-mode controlled DC-DC circuit may have a fixed frequency and is suitable for multi-phase parallel connection, but has a complex structure, a poor anti-noise capability, and a poor load transient response. A voltage-mode controlled DC-DC converter may also have a fixed frequency, but is not suitable for multi-phase parallel connection, and has an internal compensation circuit that is complex and occupies a comparatively large area. A hysteresis-mode controlled DC-DC circuit has a simple structure and a fast load transient response but has difficulty in maintaining a fixed frequency.

In a today's commercial power system, the consumer terminal, in particular, has an increasingly high requirement for conversion efficiency and a transient response capability of the power system. However, in an existing hysteresis-mode controlled DC-DC converter, a frequency of a generated PWM signal changes due to flipping of the PWM signal, and consequently, an operating frequency of the hysteresis-mode controlled DC-DC converter is quite difficult to be fixed, and a requirement of a load more sensitive to the frequency cannot be met.

SUMMARY

Embodiments of this application provide a voltage conversion circuit, to resolve a problem that an operating frequency of a hysteresis-mode controlled DC-DC converter is not fixed.

To achieve the foregoing objective, the following technical solutions are used in the embodiments of this application.

According to a first aspect, a voltage conversion circuit is provided. The voltage conversion circuit includes a voltage conversion subcircuit and a first feedback circuit. The voltage conversion subcircuit is configured to control conduction or cut-off of a power transistor in the voltage conversion subcircuit according to a drive signal, to convert a received direct current input voltage into a direct current output voltage, where the drive signal is a signal generated based on a PWM signal. The first feedback circuit includes a sampling and amplification circuit configured to sample and amplify the direct current output voltage to obtain a sampling signal, and output the sampling signal, a signal synthesis circuit configured to synthesize the sampling signal and a triangular wave signal into a first signal, and output the first signal, a second feedback circuit configured to sample the direct current output voltage to obtain a second signal, and output the second signal, and a comparison circuit configured to compare the first signal and the second signal, to output the PWM signal.

In the foregoing technical solutions, the PWM signal used for turning on or switching off the power transistor is obtained based on the first signal and the second signal, the first signal is obtained through superimposition of the triangular wave signal and the sampling signal, and a frequency of the first signal may be determined by a frequency of the triangular wave signal. Because the frequency of the triangular wave signal can be fixed, a fixed switching frequency is implemented for a hysteresis-mode controlled voltage conversion circuit. In addition, the PWM signal can be compensated using the second signal, such that the voltage conversion circuit has a quite strong transient response capability.

In a possible implementation of the first aspect, the frequency of the triangular wave signal and a frequency of the PWM signal are controllable, and the first signal is a frequency-controllable feedback ripple signal. In the foregoing technical solutions, it can be implemented that the switching frequency of the voltage conversion circuit is controllable. That is, the voltage conversion circuit can be enabled to operate at different frequencies as required, thereby improving performance of the voltage conversion circuit.

In a possible implementation of the first aspect, a direct current component of the first signal is controlled by the sampling signal, and the frequency of the triangular wave signal is the same as the frequency of the first signal. In the foregoing possible implementation, it can be implemented that the direct current component of the first signal is determined by an output of the sampling and amplification circuit, and the frequency of the first signal is determined by the frequency of the triangular wave signal. Because the frequency of the triangular wave signal is controllable, complexity in designing a next circuit can be reduced during subsequent circuit compensation.

In a possible implementation of the first aspect, the sampling and amplification circuit includes a voltage-dividing sampling circuit and an error amplification circuit. The voltage-dividing sampling circuit is configured to perform voltage-dividing sampling on the direct current output voltage to obtain a voltage-dividing sampling signal, and input the voltage-dividing sampling signal into the error amplification circuit. The error amplification circuit is configured to compare the voltage-dividing sampling signal and a first reference voltage signal, and amplify a difference signal between the voltage-dividing sampling signal and the first reference voltage signal to obtain the sampling signal. In the foregoing possible implementation, a simple sampling and amplification circuit is provided, such that the sampling signal can be effectively generated.

In a possible implementation of the first aspect, the voltage-dividing sampling circuit includes a first resistor and a second resistor, where the first resistor is coupled between a first input end of the error amplification circuit and an output end of the direct current output voltage, and the second resistor is coupled between the first input end of the error amplification circuit and a ground terminal. The error amplification circuit includes an error amplifier, a first capacitor, and a third resistor, where a first input end of the error amplifier is coupled to the voltage-dividing sampling circuit through the third resistor, the first capacitor is coupled between the first input end of the error amplifier and an output end of the error amplifier, the output end of the error amplifier is coupled to the signal synthesis circuit, and a second input end of the error amplifier is configured to receive the first reference voltage signal. In the foregoing possible implementation, a simple voltage-dividing sampling circuit and a simple error amplification circuit are provided.

In a possible implementation of the first aspect, the signal synthesis circuit includes a triangular wave signal generator and a signal synthesizer. The triangular wave signal generator is configured to generate the triangular wave signal, control the frequency of the triangular wave signal, and input the triangular wave signal into the signal synthesizer. The signal synthesizer is configured to synthesize the sampling signal and the frequency-controllable triangular wave signal into the frequency-controllable feedback ripple signal. In the foregoing possible implementation, a simple signal synthesis circuit is provided, and the frequency-controllable feedback ripple signal can be effectively synthesized.

In a possible implementation of the first aspect, the second feedback circuit includes a resistor-capacitor (RC) compensation circuit, where the RC compensation circuit is configured to compensate a highest-frequency pole generated by an energy storage element in the voltage conversion subcircuit. In the foregoing possible implementation, the highest-frequency pole in the voltage conversion circuit can be compensated.

In a possible implementation of the first aspect, the RC compensation circuit includes a second capacitor, a third capacitor, a fourth resistor, a fifth resistor, and a sixth resistor. Both the second capacitor and the fourth resistor are coupled between the comparison circuit and a coupling end, the fifth resistor is coupled between the fourth resistor and the ground terminal, and the third capacitor and the sixth resistor are connected in series and coupled between the comparison circuit and the ground terminal. In the foregoing possible implementation, a simple RC compensation circuit is provided, thereby implementing compensation for the highest-frequency pole in the voltage conversion circuit.

In a possible implementation of the first aspect, the second feedback circuit further includes a voltage-current conversion circuit, a voltage follower, and a voltage amplification circuit. An input end of the voltage-current conversion circuit is coupled to the output end of the direct current output voltage, a first output end of the voltage-current conversion circuit is coupled to an input end of the voltage follower, a second output end of the voltage-current conversion circuit is coupled to an output end of the voltage amplification circuit, and an output end of the voltage follower is coupled to a first end of the fourth resistor, where the first end of the fourth resistor is an end that is of the fourth resistor and that is coupled to the output end of the direct current output voltage. The voltage-current conversion circuit is configured to perform voltage-dividing sampling on the direct current output voltage, compare the voltage-dividing sampled signal with a second reference voltage signal to obtain a current signal, and output a voltage-variable signal at the first output end of the voltage-current conversion circuit according to the current signal. The voltage amplification circuit is configured to amplify a preset voltage signal, to obtain an amplified voltage signal. The voltage follower is configured to buffer a signal obtained after the voltage-variable signal and the amplified voltage signal are superimposed. In the foregoing possible implementation, an alternating current part and a direct current part of the second signal generated by the second feedback circuit can be separated, thereby implementing separate control of the alternating current part and the direct current part.

In a possible implementation of the first aspect, the voltage-current conversion circuit includes a voltage-current converter, a seventh resistor, an eighth resistor, and a ninth resistor, and the voltage amplifier circuit includes a voltage amplifier, a tenth resistor, and an eleventh resistor. The fourth resistor is coupled to the output end of the voltage follower. The input end of the voltage follower is coupled to an output end of the voltage-current converter. One input end of the voltage-current converter is respectively coupled to one end of the seventh resistor and one end of the eighth resistor, and the other input end of the voltage-current converter is configured to input the second reference voltage signal. The other end of the seventh resistor is coupled to the output end of the direct current output voltage. The other end of the eighth resistor is coupled to the ground terminal. The voltage amplifier is coupled to the input end of the voltage follower through the ninth resistor, a first input end of the voltage amplifier is configured to input the preset voltage signal, and a second input end of the voltage amplifier is coupled to an output end of the voltage amplifier through the tenth resistor. The eleventh resistor is coupled between the output end of the voltage amplifier and the ground terminal. In the foregoing possible implementation, a circuit design capable of separating the alternating current part and the direct current part of the second signal is provided.

In a possible implementation of the first aspect, the first feedback circuit further includes a logic circuit and a drive circuit. An output end of the comparison circuit is connected to the power transistor through the logic circuit and the drive circuit sequentially. The logic circuit is configured to compare the frequency-controllable PWM signal with a preset control logic signal, to obtain a control signal that controls conduction and cut-off of the power transistor. The drive circuit is configured to convert the control signal into a drive signal with a driving capability, and use the drive signal to turn on and switch off the power transistor. In the foregoing possible implementation, a method for turning on and switching off the power transistor using the PWM signal is provided, thereby enabling the voltage conversion circuit to output a frequency-fixed direct current voltage.

In a possible implementation of the first aspect, the power transistor includes a first power transistor and a second power transistor, and the energy storage element in the voltage conversion subcircuit includes a first energy storage element and a second energy storage element. The second power transistor is switched off when the first power transistor is turned on, and the second power transistor is turned on when the first power transistor is switched off. The first energy storage element and the second energy storage element are coupled to the first power transistor and the second power transistor. When the first power transistor is turned on and the second power transistor is switched off, the direct current input voltage stores energy through the first energy storage element, and charges the second energy storage element, or when the first power transistor is switched off and the second power transistor is turned on, the second energy storage element discharges, and the first energy storage element releases energy through the second power transistor. In the foregoing possible implementation, a buck hysteresis-mode controlled voltage conversion circuit is provided, thereby enabling the buck hysteresis-mode controlled voltage conversion circuit to output a frequency-fixed direct current voltage.

In a possible implementation of the first aspect, in the buck hysteresis-mode controlled voltage conversion circuit, the first power transistor is a P-channel metal-oxide-semiconductor (PMOS) transistor, the second power transistor is an N-type metal-oxide-semiconductor (NMOS) transistor, the first energy storage element is an inductor (L1), and the second energy storage element is a capacitor (C0). For example, a drain of the PMOS transistor is connected to an input end of the direct current input voltage, both a source of the PMOS transistor and a drain of the NMOS transistor are connected to one end of the inductor (L1), a gate of the PMOS transistor is connected to a gate of the NMOS transistor, a source of the NMOS transistor is connected to the ground terminal, the other end of the inductor (L1) is connected to one end of the capacitor (C0), and the other end of the capacitor (C0) is connected to the ground terminal.

In a possible implementation of the first aspect, the power transistor includes a first power transistor and a second power transistor, and the energy storage element in the voltage conversion subcircuit includes a first energy storage element and a second energy storage element. The second power transistor is switched off when the first power transistor is turned on, and the second power transistor is turned on when the first power transistor is switched off. The first energy storage element and the second energy storage element are coupled to the first power transistor and the second power transistor. When the first power transistor is turned on and the second power transistor is switched off, the direct current input voltage stores energy through the first energy storage element, and the second energy storage element discharges, or when the first power transistor is switched off and the second power transistor is turned on, the first energy storage element releases energy through the second power transistor, and the first energy storage element and the direct current input voltage charge the second energy storage element. In the foregoing possible implementation, a boost hysteresis-mode controlled voltage conversion circuit is provided, thereby enabling the boost hysteresis-mode controlled voltage conversion circuit to output a frequency-fixed direct current voltage.

In a possible implementation of the first aspect, in the boost hysteresis-mode controlled voltage conversion circuit, the first power transistor is a PMOS transistor, the second power transistor is an NMOS transistor, the first energy storage element is an inductor (L1), and the second energy storage element is a capacitor (C0). For example, one end of the inductor (L1) is connected to an input end of the direct current input voltage, the other end of the inductor L1 is connected to a drain of the PMOS transistor and a drain of the NMOS transistor, a source of the PMOS transistor is connected to the ground terminal, a gate of the PMOS transistor is connected to a source of the NMOS transistor, a drain of the NMOS transistor is connected to one end of the capacitor (C0), and the other end of the capacitor (C0) is connected to the ground terminal.

In a possible implementation of the first aspect, the power transistor includes a first power transistor, a second power transistor, a third power transistor, and a fourth power transistor, and the energy storage element in the voltage conversion subcircuit includes a first energy storage element and a second energy storage element. The second power transistor is switched off when the first power transistor is turned on, and the second power transistor is turned on when the first power transistor is switched off. The fourth power transistor is switched off when the third power transistor is turned on, and the fourth power transistor is turned on when the third power transistor is switched off. The first energy storage element and the second energy storage element are coupled to the third power transistor and the fourth power transistor, and the first energy storage element is also coupled to the first power transistor and the second power transistor. In a case in which the first power transistor is turned on and the second power transistor is switched off, when the third power transistor is turned on and the fourth power transistor is switched off, the direct current input voltage stores energy through the first energy storage element, and the second energy storage element discharges, or when the third power transistor is switched off and the fourth power transistor is turned on, the first energy storage element releases energy through the fourth power transistor, and the first energy storage element and the input voltage charge the second energy storage element. In a case in which the third power transistor is switched off and the fourth power transistor is turned on, when the first power transistor is turned on and the second power transistor is switched off, the direct current input voltage charges the second energy storage element through the first energy storage element, or when the first power transistor is switched off and the second power transistor is turned on, the second energy storage element discharges through the first energy storage element and the second power transistor. In the foregoing possible implementation, a buck-boost hysteresis-mode controlled voltage conversion circuit is provided, thereby enabling the buck-boost hysteresis-mode controlled voltage conversion circuit to output a frequency-fixed direct current voltage.

In a possible implementation of the first aspect, in the buck-boost hysteresis-mode controlled voltage conversion circuit, the first power transistor is a PMOS1 transistor, the second power transistor is an NMOS1 transistor, the third power transistor is a PMOS2 transistor, the fourth power transistor is an NMOS2 transistor, the first energy storage element is an inductor (L1), and the second energy storage element is a capacitor (C0). For example, a drain of the PMOS1 transistor is connected to an input end of the direct current input voltage, both a source of the PMOS1 transistor and a drain of the NMOS1 transistor are connected to one end of the inductor (L1), a gate of the PMOS1 transistor is connected to a gate of the NMOS1 transistor, a source of the NMOS1 transistor is connected to the ground terminal, both a drain of the PMOS2 transistor and a source of the NMOS2 transistor are connected to the other end of the inductor (L1), a gate of the PMOS2 transistor is connected to a gate of the NMOS2 transistor, a source of the PMOS2 transistor is connected to a ground terminal, a drain of the NMOS2 transistor is connected to one end of the capacitor (C0), and the other end of the capacitor (C0) is connected to the ground terminal.

According to a second aspect, a multi-phase parallel power system is provided. The multi-phase parallel power system includes N voltage conversion circuits, where the voltage conversion circuit is the voltage conversion circuit provided in any one of the first aspect or the possible implementations of the first aspect, and N≥2. Frequencies of triangular wave signals in all the N voltage conversion circuits are the same, and a phase of the $i^{th}$ voltage conversion circuit is i×360 degrees (°)/N, where 1≤i≤N. The N voltage conversion circuits share one sampling and amplification circuit.

According to a third aspect, a voltage conversion method is provided. The method includes turning on or switching off a power transistor according to a drive signal, to convert a received direct current input voltage into a direct current output voltage, where the drive signal is a signal generated based on a PWM signal, sampling and amplifying the direct current output voltage to obtain a sampling signal, synthesizing the sampling signal and a triangular wave signal into a first signal, sampling the direct current output voltage to obtain a second signal, and comparing the first signal and the second signal, to output the PWM signal.

In a possible implementation of the third aspect, a frequency of the triangular wave signal and a frequency of the PWM signal are controllable, and the first signal is a frequency-controllable feedback ripple signal.

In a possible implementation of the third aspect, a direct current component of the first signal is controlled by the sampling signal, and the frequency of the triangular wave signal is the same as a frequency of the first signal.

In a possible implementation of the third aspect, sampling and amplifying the direct current output voltage to obtain a sampling signal includes performing voltage-dividing sampling on the direct current output voltage to obtain a voltage-dividing sampling signal, and comparing the voltage-dividing sampling signal and a first reference voltage signal, and amplifying a difference signal between the voltage-dividing sampling signal and the first reference voltage signal to obtain the sampling signal.

In a possible implementation of the third aspect, synthesizing the sampling signal and a triangular wave signal into a first signal includes generating the triangular wave signal, controlling the frequency of the triangular wave signal, and synthesizing the sampling signal and the frequency-controllable triangular wave signal into the frequency-controllable feedback ripple signal.

In a possible implementation of the third aspect, the method further includes comparing the frequency-controllable PWM signal with a preset control logic signal, to obtain a control signal that turns on and switches off the power transistor, and converting the control signal into a drive signal with a driving capability, and using the drive signal to turn on and switch off the power transistor.

In a possible implementation of the third aspect, the power transistor includes a first power transistor and a second power transistor, and the turning on or switching off a power transistor includes controlling the second power transistor to be switched off when the first power transistor is turned on, and controlling the second power transistor to be turned on when the first power transistor is switched off. When the first power transistor is turned on and the second power transistor is switched off, the direct current input voltage stores energy through a first energy storage element, and charges a second energy storage element, or when the first power transistor is switched off and the second power transistor is turned on, a second energy storage element discharges, and a first energy storage element releases energy through the second power transistor.

In a possible implementation of the third aspect, the power transistor includes a first power transistor and a second power transistor, and the turning on or switching off a power transistor includes controlling the second power transistor to be switched off when the first power transistor is turned on, and controlling the second power transistor to be turned on when the first power transistor is switched off. When the first power transistor is turned on and the second power transistor is switched off, the direct current input voltage stores energy through a first energy storage element, and a second energy storage element discharges, or when the first power transistor is switched off and the second power transistor is turned on, a first energy storage element releases energy through the second power transistor, and the first energy storage element and the direct current input voltage charge a second energy storage element.

In a possible implementation of the third aspect, the power transistor includes a first power transistor, a second power transistor, a third power transistor, and a fourth power transistor, and the turning on or switching off a power transistor includes controlling the second power transistor to be switched off when the first power transistor is turned on, controlling the second power transistor to be turned on when the first power transistor is switched off, controlling the fourth power transistor to be switched off when the third power transistor is turned on, and controlling the fourth power transistor to be turned on when the third power transistor is switched off. In a case in which the first power transistor is turned on and the second power transistor is switched off, when the third power transistor is turned on and the fourth power transistor is switched off, the direct current input voltage stores energy through a first energy storage element, and a second energy storage element discharges, or when the third power transistor is switched off and the fourth power transistor is turned on, a first energy storage element releases energy through the fourth power transistor, and the first energy storage element and the direct current input voltage charge a second energy storage element.

In a case in which the third power transistor is switched off and the fourth power transistor is turned on, when the first power transistor is turned on and the second power transistor is switched off, the direct current input voltage stores energy through a first energy storage element, and charges a second energy storage element, or when the first power transistor is switched off and the second power transistor is turned on, a second energy storage element discharges, and a first energy storage element releases energy through the second power transistor.

It may be understood that for beneficial effects that can be achieved by any one of the foregoing provided multi-phase parallel power systems to which the voltage conversion circuit is applied, or for beneficial effects that can be achieved by the voltage conversion method, reference may be made to beneficial effects of the voltage conversion circuit provided above. Details are not described herein again.

DESCRIPTION OF EMBODIMENTS

In the embodiments of this application, a frequency-controllable voltage conversion circuit can be implemented. It should be noted that "frequency-controllable" in the embodiments of this application indicates any fixed frequency, for example, 5 hertz (Hz) or 8 Hz, and a frequency may be flexibly set based on a requirement of a load that is on the voltage conversion circuit, and is not a fixed and unique value. For example, when the load requires a frequency of 5 Hz, the voltage conversion circuit in the embodiments of this application may perform voltage conversion at an operating frequency of 5 Hz. In a working process of the circuit, the operating frequency of the circuit does not change.

Figure 1:
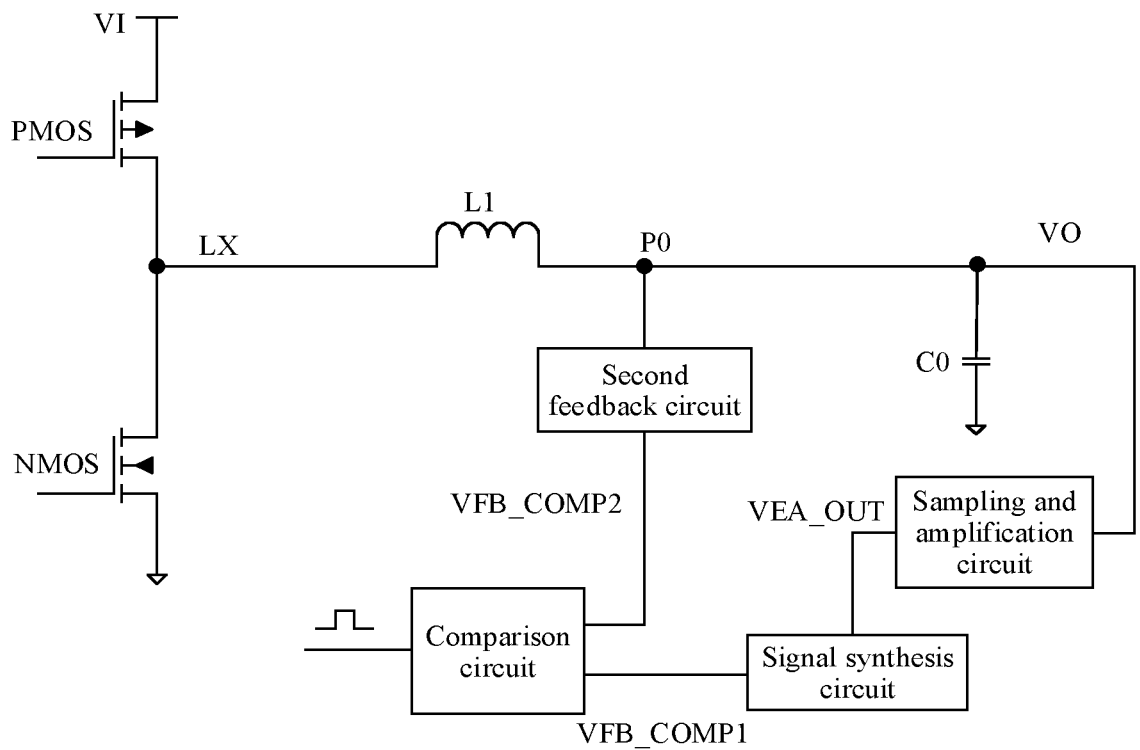
FIG. 1 is a schematic structural diagram of a voltage conversion circuit according to an embodiment of this application.

FIG. 1 is a schematic structural diagram of a voltage conversion circuit according to an embodiment of this application. As shown in FIG. 1, the voltage conversion circuit in this embodiment is configured to convert a direct current input voltage (VI) into a direct current output voltage (VO), and the voltage conversion circuit in this embodiment may include a voltage conversion subcircuit and a first feedback circuit.

The voltage conversion subcircuit may include a power transistor, and a first energy storage element (L1) and a second energy storage element (C0) that are coupled to the power transistor. In FIG. 1, an example is used for description in which the power transistor includes a PMOS transistor and NMOS transistor, the first energy storage element is an inductor L1, and the second energy storage element is a capacitor C0. FIG. 1 does not constitute a limitation on this embodiment of this application. For example, the power transistor may alternatively be another voltage-controlled transistor, for example, an insulated-gate bipolar transistor (IGBT). The voltage conversion subcircuit is configured to turn on or switch off the power transistor in the voltage conversion subcircuit according to a drive signal, to control the first energy storage element (L1) and the second energy storage element (C0) to receive and store energy of the direct current input voltage (VI), thereby converting the direct current input voltage (VI) into the direct current output voltage (VO), where the drive signal is a signal generated based on a PWM signal.

In a buck voltage conversion circuit, the voltage conversion subcircuit turns on and switches off the PMOS transistor and the NMOS transistor according to the PWM signal, to convert the direct current input voltage (VI) into the direct current output voltage (VO). For example, when the PMOS transistor is turned on and the NMOS transistor is switched off, the direct current input voltage (VI) stores energy through the first energy storage element (L1), and charges the second energy storage element (C0), or when the PMOS transistor is switched off and the NMOS transistor is turned on, the second energy storage element (C0) discharges, and the first energy storage element (L1) releases energy through the NMOS transistor. A first feedback circuit generates the PWM signal by controlling proportions corresponding to a current existing during charging and a current existing during discharging.

It should be noted that a buck DC-DC conversion circuit in FIG. 1 is used for schematic description, and a connection relationship between the power transistor and the first energy storage element (L1) in this embodiment is not limited to that shown in FIG. 1. The voltage conversion circuit in this embodiment may be of a buck type, a boost type (for details, refer to an embodiment shown in FIG. 8), and a buck-boost type (for details, refer to an embodiment shown in FIG. 9). Regardless of the type of the voltage conversion circuit in this embodiment, a principle of each type of the voltage conversion circuit is to enable the first energy storage element and the second energy storage element to be charged and discharge using the power transistor, thereby converting the direct current input voltage into the direct current output voltage and outputting the direct current output voltage.

In this embodiment of this application, the first feedback circuit includes a sampling and amplification circuit, a signal synthesis circuit, a second feedback circuit, and a comparison circuit. The sampling and amplification circuit is coupled to a coupling end P0 of the first energy storage element (L1) and the second energy storage element (C0), and configured to sample and amplify the direct current output voltage (VO) to obtain a sampling signal, and output the sampling signal. The signal synthesis circuit is configured to synthesize the sampling signal and a triangular wave signal into a first signal, and output the first signal. The second feedback circuit is configured to sample the direct current output voltage at the coupling end P0 to obtain a second signal, and output the second signal. The comparison circuit is configured to compare the first signal and the second signal, and output the PWM signal. The drive signal generated based on the PWM signal is used to turn on and switch off the power transistor.

Optionally, a frequency of the triangular wave signal VRipple and a frequency of the PWM signal are controllable, and the first signal is a frequency-controllable feedback ripple signal VFB_COMP1. The sampling signal may be used to control a direct current component of the frequency-controllable feedback ripple signal VFB_COMP1. The frequency of the frequency-controllable triangular wave signal VRipple is the same as a frequency of the frequency-controllable feedback ripple signal VFB_COMP1.

For example, the sampling and amplification circuit samples and amplifies the direct current output voltage (VO), and outputs the obtained sampling signal VEA_OUT to the signal synthesis circuit. The signal synthesis circuit generates the triangular wave signal, controls the frequency of the triangular wave signal, synthesizes the VEA_OUT and the triangular wave signal into the frequency-controllable feedback ripple signal VFB_COMP1, and outputs the frequency-controllable feedback ripple signal VFB_COMP1 to a first input end of the comparison circuit. The second feedback circuit samples the direct current output voltage (VO) to obtain the second signal VFB_COMP2, and outputs the VFB_COMP2 to a second input end of the comparison circuit. The comparison circuit compares the VFB_COMP2 and the frequency-controllable feedback ripple signal VFB_COMP1, and outputs the frequency-controllable PWM signal, to adjust the output direct current output voltage (VO).

The voltage conversion circuit shown in FIG. 1 is used as an example for description. That is, the frequency-controllable PWM signal is used to turn on or switch off the power transistor (the PMOS and the NMOS). For example, when the PMOS is turned on and the NMOS is switched off, the direct current input voltage VI stores energy through the first energy storage element (L1), and charges the second energy storage element (C0), or when the PMOS is switched off and the NMOS is turned on, the first energy storage element (L1) releases energy through the NMOS, and the second energy storage element (C0) discharges. That is, a switching frequency of the voltage conversion circuit in this embodiment is controlled using the frequency-controllable PWM signal, thereby converting the direct current input voltage VI into the direct current output voltage VO.

When the voltage conversion circuit in this embodiment is compared with a conventional hysteresis-mode controlled DC-DC circuit, the frequency-controllable feedback ripple signal VFB_COMP1 in this embodiment is obtained through superimposition of the frequency-controllable triangular wave signal VRipple and the sampling signal output by the sampling and amplification circuit. Therefore, a direct current voltage component of the feedback ripple signal may be determined by an output of the sampling and amplification circuit. Because the frequency of the feedback ripple signal VFB_COMP1 is determined by the frequency of the triangular wave signal VRipple, and the frequency of the triangular wave signal VRipple is controllable, a controllable switching frequency is implemented for a hysteresis-mode controlled voltage conversion circuit, and the hysteresis-mode controlled voltage conversion circuit has a quite strong transient response capability.

Figure 2:
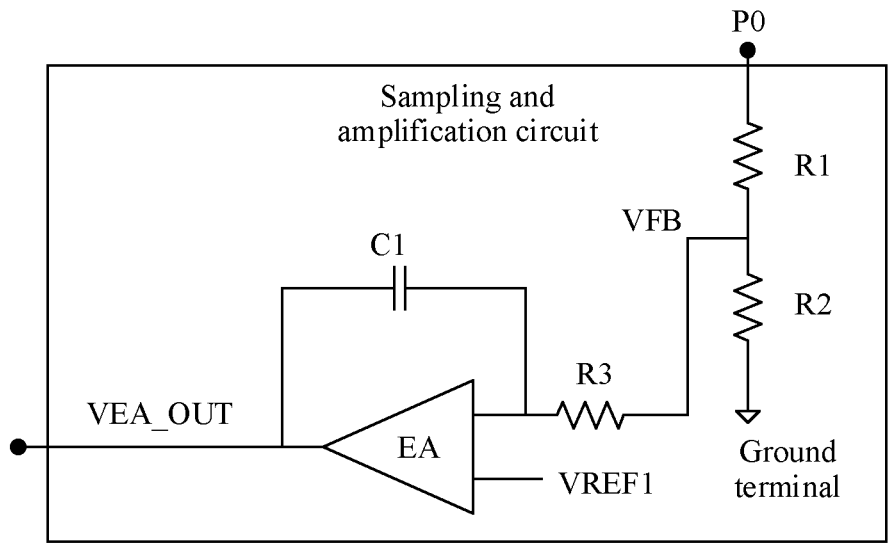
FIG. 2 is a schematic structural diagram of a sampling and amplification circuit according to an embodiment of this application.

FIG. 2 is a schematic structural diagram of a sampling and amplification circuit according to an embodiment of this application. As shown in FIG. 2, the sampling and amplification circuit includes a voltage-dividing sampling circuit and an error amplification circuit. The voltage-dividing sampling circuit is configured to perform voltage-dividing sampling on the direct current output voltage (VO) to obtain a voltage-dividing sampling signal VFB, and input the voltage-dividing sampling signal VFB into the error amplification circuit. The error amplification circuit is configured to compare the voltage-dividing sampling signal VFB and a first reference voltage signal VREF1, and amplify a difference signal between the voltage-dividing sampling signal and the first reference voltage signal VREF1 to obtain the sampling signal VEA_OUT.

For example, referring to FIG. 2, the voltage-dividing sampling circuit includes a first resistor R1 and a second resistor R2, where the first resistor R1 is coupled between a first input end of the error amplification circuit and the coupling end P0, and the second resistor R2 is coupled between the first input end of the error amplification circuit and a ground terminal. The error amplification circuit includes an error amplifier (EA), a first capacitor C1, and a third resistor R3, where a first input end of the error amplifier is coupled to the voltage-dividing sampling circuit through the third resistor R3, the first capacitor C1 is coupled between the first input end of the error amplifier and an output end of the error amplifier, the output end of the error amplifier is coupled to the signal synthesis circuit, and a second input end of the error amplifier is configured to receive the first reference voltage signal.

It should be noted that the sampling and amplification circuit shown in FIG. 2 is used merely for schematic description, and the sampling and amplification circuit in this embodiment of this application is not limited thereto.

Figure 3:
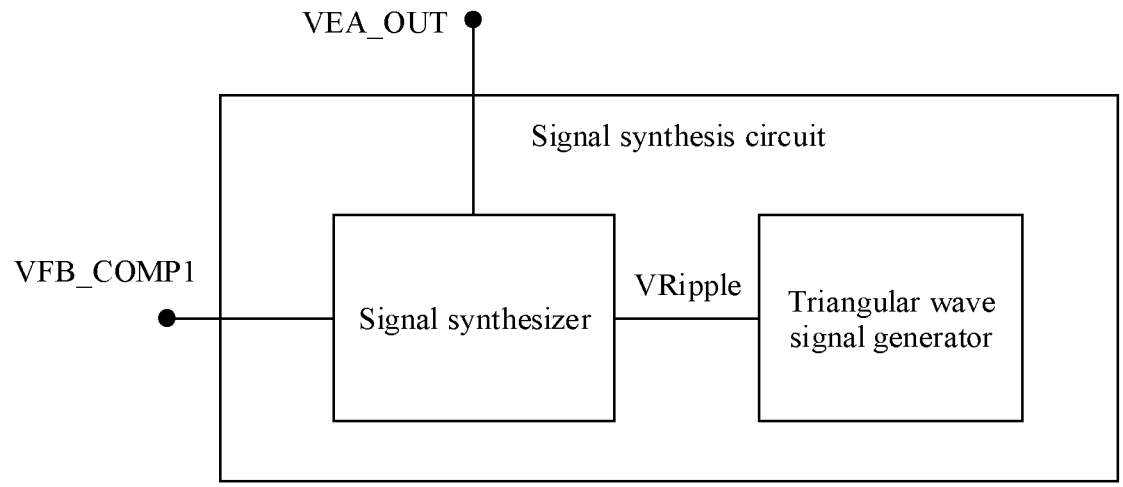
FIG. 3 is a schematic structural diagram of a signal synthesis circuit according to an embodiment of this application.

FIG. 3 is a schematic structural diagram of a signal synthesis circuit according to an embodiment of this application. As shown in FIG. 3, the signal synthesis circuit includes a triangular wave signal generator and a signal synthesizer. The triangular wave signal generator is configured to generate the frequency-controllable triangular wave signal VRipple, and input the frequency-controllable triangular wave signal VRipple into the signal synthesizer. The signal synthesizer is configured to synthesize the sampling signal VEA_OUT and the frequency-controllable triangular wave signal VRipple into the frequency-controllable feedback ripple signal VFB_COMP1.

Optionally, the frequency-controllable triangular wave signal VRipple includes a frequency-fixed triangular wave signal, and correspondingly, the frequency-controllable feedback ripple signal VFB_COMP1 includes a frequency-fixed feedback ripple signal.

In actual application, the signal synthesizer may also be referred to as a signal superimposer, and may be implemented by a simple superimposition circuit. The signal synthesis circuit performs superimposition on the frequency-controllable triangular wave signal and the sampling signal that is output by the sampling and amplification circuit, to obtain the frequency-controllable feedback ripple signal, such that the frequency of the feedback ripple signal VFB_COMP1 is determined by the frequency of the triangular wave signal VRipple. Because the frequency of the triangular wave signal VRipple is controllable, the frequency of the feedback ripple signal VFB_COMP1 is controllable. In addition, the direct current voltage component of the feedback ripple signal is determined by the output of the sampling and amplification circuit VEA_OUT. That is, a feedback direct current gain of the feedback ripple signal VFB_COMP1 is determined by the sampling and error amplifier, thereby reducing complexity in designing a next circuit during subsequent circuit compensation.

Figure 4:
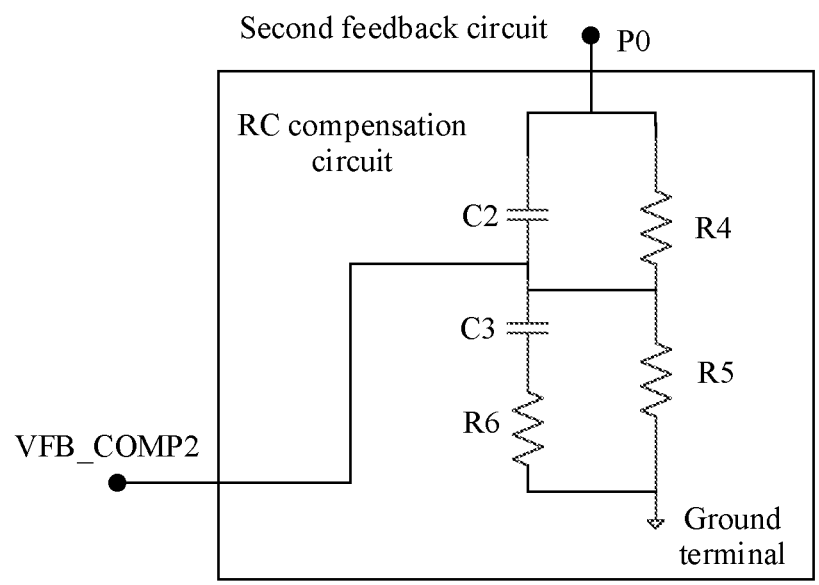
FIG. 4 is a schematic structural diagram of a second feedback circuit according to an embodiment of this application.

FIG. 4 is a schematic structural diagram of a second feedback circuit according to an embodiment of this application. Referring to FIG. 4, the second feedback circuit includes an RC compensation circuit, where the RC compensation circuit is configured to compensate a highest-frequency pole generated by the first energy storage element (L1) and the second energy storage element (C0). For example, the first energy storage element (L1) and the second energy storage element (C0) generate two frequency poles, which are F1 and F2. If F1>F2, the RC compensation circuit may be configured to compensate the pole F1.

For example, referring to FIG. 4, the RC compensation circuit includes a second capacitor C2, a third capacitor C3, a fourth resistor R4, a fifth resistor R5, and a sixth resistor R6. Both the second capacitor C2 and the fourth resistor R4 are coupled between the comparison circuit and the coupling end P0, the fifth resistor R5 is coupled between the fourth resistor R4 and the ground terminal, and the third capacitor C3 and the sixth resistor R6 are connected in series and coupled between the comparison circuit and the ground terminal.

Further, the second feedback circuit further includes a voltage-current conversion circuit, a voltage follower, and a voltage amplification circuit. An input end of the voltage-current conversion circuit is coupled to the coupling end P0, a first output end of the voltage-current conversion circuit is coupled to an input end of the voltage follower, a second output end of the voltage-current conversion circuit is coupled to an output end of the voltage amplification circuit, and an output end of the voltage follower is coupled to a first end of the fourth resistor R4, where the first end of the R4 is an end that is of the fourth resistor and that is coupled to an output end of the direct current output voltage (VO). The voltage-current conversion circuit is configured to perform voltage-dividing sampling on the direct current output voltage (VO), compare the voltage-dividing sampled signal with a second reference voltage signal VREF2 to obtain a current signal, and output a voltage-variable signal according to the current signal. The voltage amplification circuit is configured to amplify a preset voltage signal VCM, to obtain an amplified voltage signal. The voltage follower is configured to buffer a signal obtained after the voltage-variable signal and the amplified voltage signal are superimposed, to enable the signal obtained through superimposition to have a driving capability.

Figure 5:
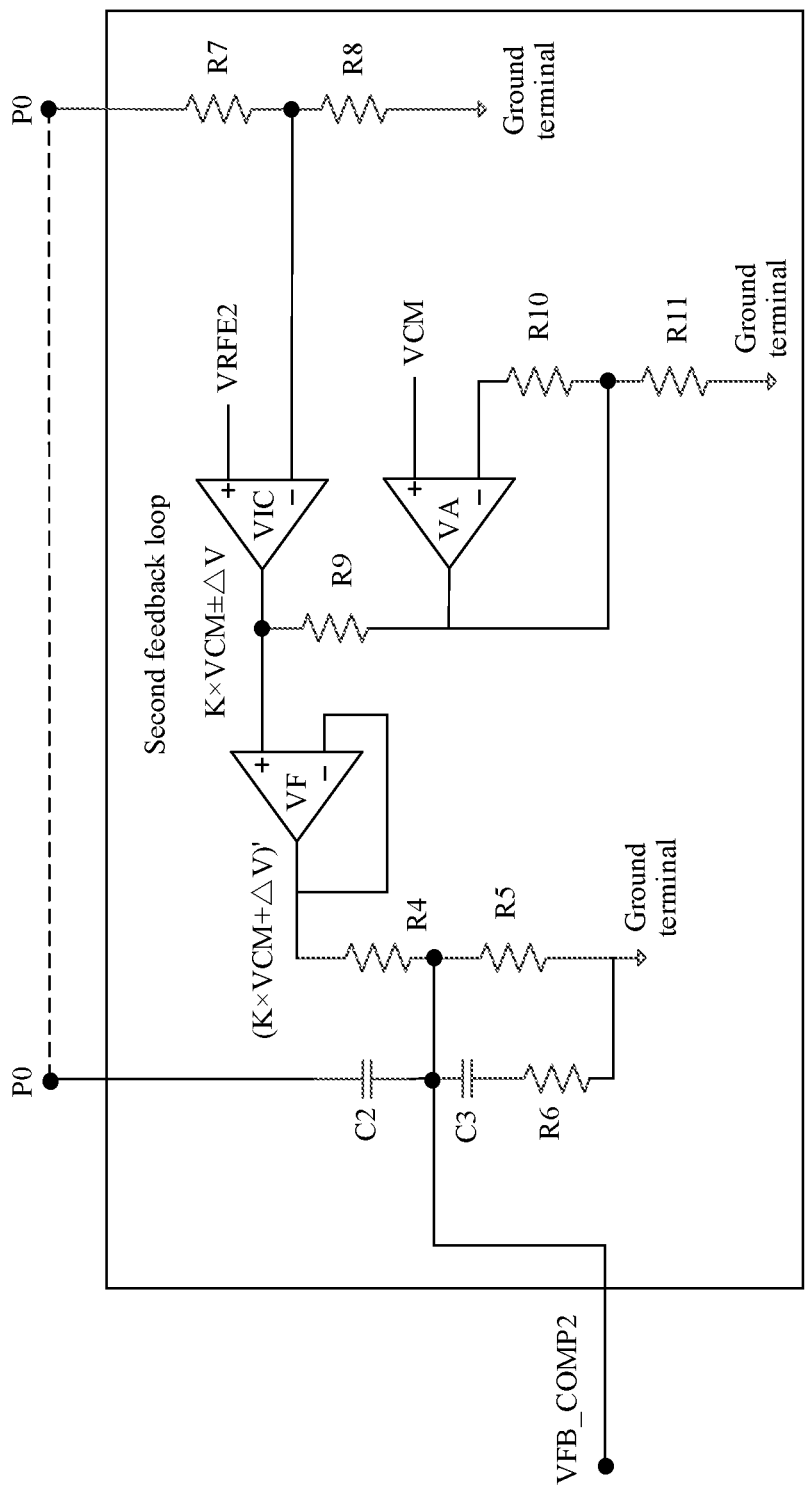
FIG. 5 is a schematic structural diagram of a second feedback circuit according to an embodiment of this application.

For example, referring to FIG. 5, the voltage-current conversion circuit includes a voltage-current converter (VIC), a seventh resistor R7, an eighth resistor R8, and a ninth resistor R9, and the voltage amplifier circuit includes a voltage amplifier (VA), a tenth resistor R10, and an eleventh resistor R11. The fourth resistor R4 is coupled to the output end of the voltage follower (VF), the input end of the voltage follower (VF) is coupled to an output end of the voltage-current converter (V-I), one input end of the voltage-current converter (V-I) is respectively coupled to one end of the seventh resistor R7 and one end of the eighth resistor R8, the other input end of the voltage-current converter (V-I) is configured to input the second reference voltage signal VREF2, the other end of the seventh resistor R7 is coupled to the coupling end P0, the other end of the eighth resistor R8 is coupled to the ground terminal, the voltage amplifier VA is coupled to the input end of the voltage follower (VF) through the ninth resistor R9, a first input end of the voltage amplifier (VA) is configured to input the preset voltage signal VCM, a second input end of the voltage amplifier (VA) is coupled to an output end of the voltage amplifier (VA) through the tenth resistor R10, and the eleventh resistor R11 is coupled between the output end of the voltage amplifier (VA) and the ground terminal. Optionally, the R4 and the R7 have a same resistance value, and the R5 and the R8 have a same resistance value. In FIG. 5, VIC represents the voltage-current converter (V-to-I converter), VA represents the voltage amplifier, and VF represents the voltage follower.

For example, assuming that an amplification multiple of the voltage amplifier is K, an output voltage of the voltage amplifier is K×VCM. If a voltage drop on the R9 is ΔV, an input voltage of the VF may be expressed as K×VCM±ΔV, and an output voltage of the VF may be expressed as (K×VCM±ΔV)'. Correspondingly, VFB_COMP2 is equal to a voltage drop of (K×VCM±ΔV)' on the fifth resistor R5.

In the second feedback circuit shown in FIG. 5, a path on which the direct current output voltage (VO) is coupled to the RC compensation circuit is divided into two parts. On one part, the direct current output voltage (VO) is sent to an end of the second capacitor C2 in the RC compensation circuit, and on the other part, the direct current output voltage (VO) is coupled to an end of the fourth resistor R4 in the RC compensation circuit after passing through a circuit including the VIC, the R7, the R8, the VA, the R9, the R10, the R11, and the VF. Using this structure, a direct current part of a finally obtained output signal of the second feedback circuit can be determined by the VCM, and an alternating current part of the finally obtained output signal of the second feedback circuit can still retain a compensation characteristic of the RC compensation circuit.

The voltage conversion circuit provided in this embodiment of this application is applied to a hysteresis-mode controlled DC-DC converter. Because the frequency of the VRipple in the voltage conversion circuit in this embodiment of this application is controllable, it can be learned from the foregoing analysis that the frequency of the frequency-controllable feedback ripple signal VFB_COMP2 is controllable, and the direct current component of the frequency-controllable feedback ripple signal VFB_COMP2 is determined by the sampling signal VEA_OUT output by the error amplifier EA. Therefore, using the voltage conversion circuit in this embodiment of this application, it can be implemented that a switching frequency of the hysteresis-mode controlled DC-DC converter is controllable, and the hysteresis-mode controlled DC-DC converter has a quite strong transient response capability.

The voltage conversion circuit provided in this application divides a closed-loop feedback system of a DC-DC converter into a fast feedback path (that is, a feedback path on which the second feedback circuit is located) and a slow feedback path (that is, a feedback path on which the sampling and amplification circuit is located), and performs superimposition on an output of the slow feedback path and an output of the fast feedback path at an input end of a comparator CMP, such that a closed-loop feedback characteristic of the DC-DC converter has compensation network characteristics of the slow and fast feedback paths. Alternating current (AC) characteristics and direct current (DC) characteristics of two compensation networks are consolidated after being superimposed at the comparator, and present a characteristic of a parallel path. At each frequency band of a feedback network, the closed-loop feedback characteristic of the DC-DC converter may smoothly transition from a low-band slow feedback network to a high-band fast feedback network, thereby enabling seamless switching between the two feedback paths. In addition, after a closed-loop feedback path of the DC-DC converter is divided into two paths, superimposition is performed on the output of the high-precision slow-response error amplifier and the triangular wave signal that determines a switching frequency of the DC-DC converter. This function can be implemented by a superimposition circuit with a lower response speed, thereby reducing difficulty in designing a summing circuit of a triangular wave and a feedback signal. Besides, the fast AC feedback path is isolated from another characteristic, and an RC network of the fast AC feedback path determines only the AC characteristic of the fast AC feedback path, thereby enabling simpler high-band compensation design for the feedback path.

For a clearer understanding of how to implement a fixed switching frequency for the hysteresis-mode controlled DC-DC converter using the voltage conversion circuit in this application, the following uses a buck hysteresis-mode controlled DC-DC converter as an example for description. It should be noted that the voltage conversion circuit in this application may be alternatively applied to a boost hysteresis-mode controlled DC-DC converter (refer to the embodiment shown in FIG. 8) and a buck-boost hysteresis-mode controlled DC-DC converter (refer to the embodiment shown in FIG. 9), to implement a fixed switching frequency.

Figure 6:
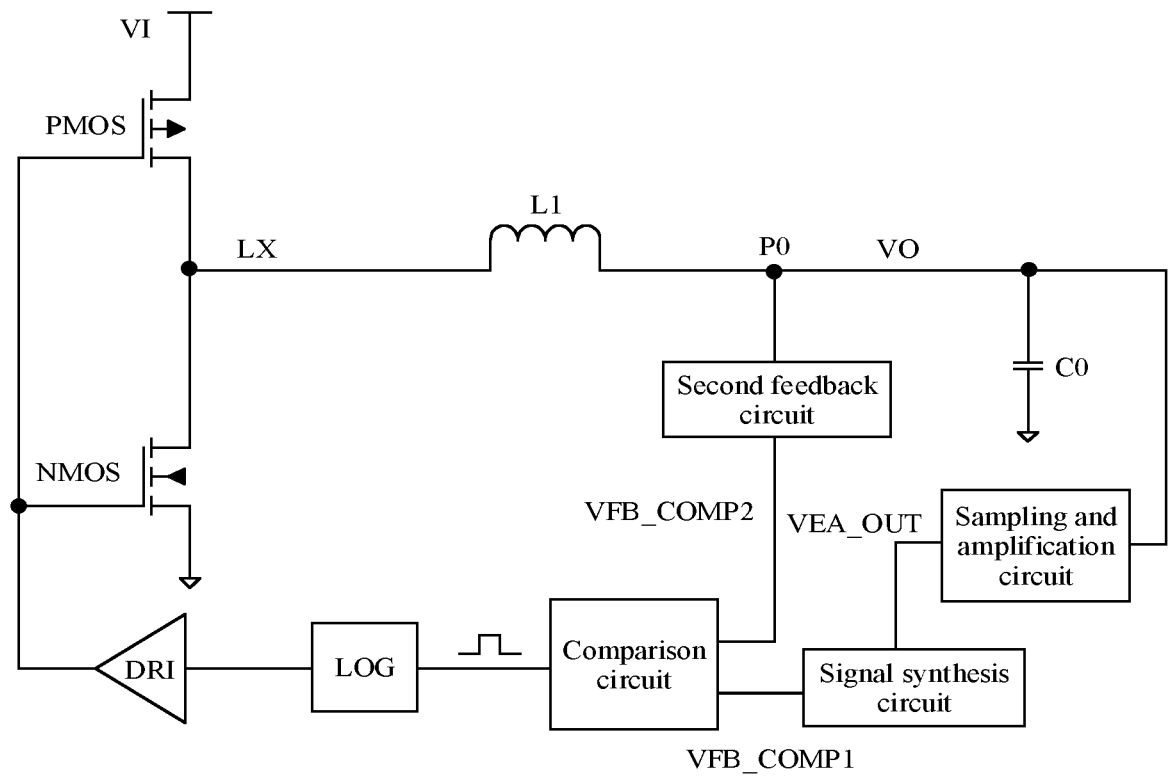
FIG. 6 is a schematic structural diagram of a voltage conversion circuit according to an embodiment of this application.

FIG. 6 is a schematic structural diagram of another voltage conversion circuit according to this application. This embodiment is a specific embodiment in which the voltage conversion circuit shown in FIG. 1 is applied to the buck hysteresis-mode controlled DC-DC converter. As shown in FIG. 6, a comparison circuit in this embodiment uses a comparator (CMP) as an example for description, and the voltage conversion circuit in this embodiment may include a first power transistor (PMOS), a second power transistor (NMOS), an inductor (L1), a capacitor (C0), a second feedback circuit, a comparator (CMP), a sampling and amplification circuit, a signal synthesis circuit, a logic circuit (LOG), and a drive circuit (DRI).

The sampling and amplification circuit may include a voltage-dividing sampling circuit and an error amplification circuit. The voltage-dividing sampling circuit is configured to perform voltage-dividing sampling on a direct current output voltage (VO) to obtain a voltage-dividing sampling signal VFB, and input the voltage-dividing sampling signal VFB into the error amplification circuit. The error amplification circuit is configured to compare the voltage-dividing sampling signal VFB and a first reference voltage signal VREF1, amplify a difference signal between the voltage-dividing sampling signal VFB and the first reference voltage signal VREF1 to obtain a sampling signal VEA_OUT, and input the sampling signal VEA_OUT into the signal synthesis circuit.

The signal synthesis circuit includes a triangular wave signal generator and a signal synthesizer. The triangular wave signal generator is configured to generate a frequency-controllable triangular wave signal VRipple, and input the frequency-controllable triangular wave signal VRipple into the signal synthesizer. The signal synthesizer is configured to synthesize the sampling signal VEA_OUT and the frequency-controllable triangular wave signal VRipple into a frequency-controllable feedback ripple signal VFB_COMP1, and output the frequency-controllable feedback ripple signal VFB_COMP1 to a first input end of the comparator CMP.

The second feedback circuit is configured to sample the direct current output voltage (VO) at a coupling end P0 to obtain a second signal VFB_COMP2, and output the second signal VFB_COMP2 to a second input end of the comparator (CMP). Optionally, for a structure of the second feedback circuit, refer to FIG. 4 or FIG. 5.

The comparison circuit (CMP) is configured to compare the frequency-controllable feedback ripple signal VFB_COMP1 and the second signal VFB_COMP2, and output a PWM signal. A drive signal generated based on the PWM signal is used to turn on or switch off the power transistors. An output end of the comparison circuit (CMP) is connected to the power transistors through the logic circuit (LOG) and the drive circuit (DRI) sequentially. The logic circuit (LOG) is configured to compare the frequency-controllable PWM signal with a preset control logic signal, to obtain a control signal that turns on and switches off the power transistors. The drive circuit (DRI) is configured to convert the control signal into a drive signal with a driving capability, and use the drive signal to turn on and switch off the power transistors. The power transistors include the first power transistor (PMOS) and the second power transistor (NMOS). The inductor (L1) and the capacitor (C0) are used as the first energy storage element and the second energy storage element in the foregoing embodiment, respectively.

A specific connection relationship of the voltage conversion circuit in this embodiment is as follows The first power transistor (PMOS) and the second power transistor (NMOS) are connected in series, a first terminal of the first power transistor (PMOS) is connected to a positive electrode VI of an input voltage source, a second terminal of the first power transistor (PMOS) and a second terminal of the second power transistor (NMOS) are connected at a first connection point, and a third terminal of the first power transistor (PMOS) and a first terminal of the second power transistor (NMOS) are connected at a second connection point LX, a third terminal of the second power transistor (NMOS) is grounded, and one end of the inductor L1 is connected to the second connection point LX, and the other end of the inductor L1 is connected to an output node (that is, the coupling end P0).

Further, the first power transistor PMOS and the second power transistor NMOS in this embodiment may be metal-oxide-semiconductor (MOS) transistors, the first power transistor PMOS is a P-type MOS transistor, and the second power transistor NMOS is an N-type MOS transistor. Correspondingly, the first terminals are drains, the second terminals are gates, and the third terminals are sources. That is, a drain of the first power transistor PMOS is connected to a positive electrode VI of a direct current input voltage, a source of the first power transistor PMOS is connected to a drain of the second power transistor NMOS, a gate of the first power transistor PMOS is connected to a gate of the second power transistor NMOS, and a source of the second power transistor NMOS is grounded.

A specific operating manner of the voltage conversion circuit in this embodiment is as follows. The sampling and amplification circuit and the signal synthesis circuit work together to provide the frequency-fixed feedback ripple signal VFB_COMP1. The second feedback circuit provides the second signal VFB_COMP2. After the VFB_COMP1 and the VFB_COMP2 are compared, the frequency-fixed PWM signal is output. When the frequency-fixed PWM signal is at a high level, the first power transistor (PMOS) is turned on, and the second power transistor (NMOS) is switched off. In this case, the direct current input voltage VI stores energy through the inductor (L1), and charges the capacitor (C0). Later, when the frequency-fixed PWM signal flips to a low level, the first power transistor (PMOS) is switched off, and the second power transistor (NMOS) is turned on. In this case, the capacitor (C0) discharges, and the inductor (L1) releases energy through the second power transistor (NMOS). In other words, a switching frequency of the voltage conversion circuit in this embodiment is controlled using the frequency-fixed PWM signal, thereby converting the direct current input voltage VI into the direct current output voltage VO.

In the voltage conversion circuit in this embodiment, the frequency-fixed triangular wave signal is coupled using the signal synthesis circuit, such that an operating frequency of the voltage conversion circuit in this embodiment is fixed. Therefore, a load requirement for a fixed frequency can be met, compensation is not required in a hysteresis mode, and a response speed is high. In addition, because the operating frequency is fixed, the voltage conversion circuit in this embodiment can be applied to a multi-phase parallel power system, to enable the multi-phase parallel power system to meet an application scenario of a large load current.

The following provides a supplementary explanation for the foregoing embodiment using a diagram of an operating waveform of a key node in the foregoing embodiment.

Figure 7:
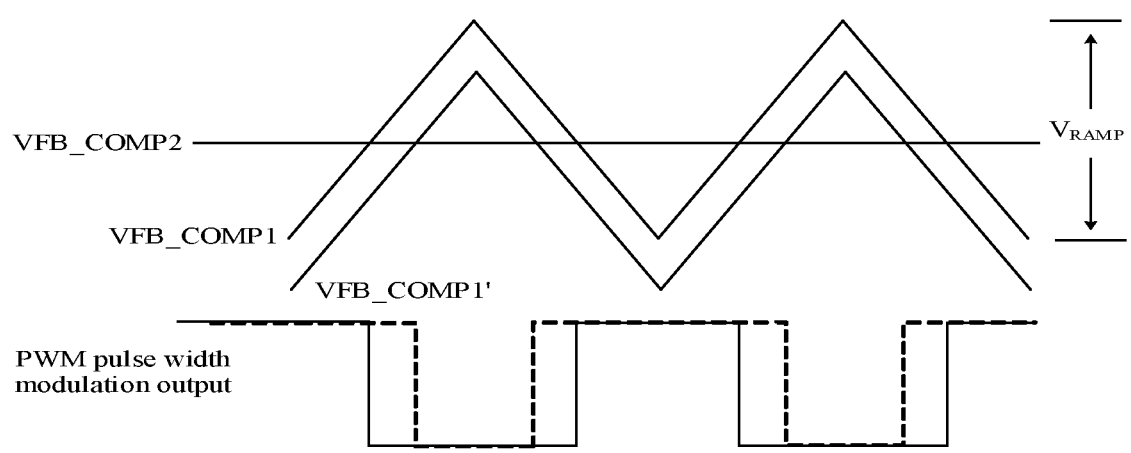
FIG. 7 is a schematic diagram of an operating waveform of a key node in a voltage conversion circuit according to an embodiment of this application.

FIG. 7 is a schematic diagram of an operating waveform of a key node in a voltage conversion circuit according to this application. As shown in FIG. 7, the signal VFB_COMP1 in a shape of a triangular wave is an operating waveform of an output node of the signal synthesizer in FIG. 3, that is, an operating waveform of the first input end of the comparator CMP, the signal VFB_COMP2 in a shape of a straight line is an operating waveform of an output node of the second feedback circuit shown in FIG. 4 or FIG. 5, that is, an operating waveform of the second input end of the comparator CMP, and a signal in a shape of a square wave is an output signal (PWM output signal) of the comparator CMP, that is, an operating waveform of the output end of the comparator CMP. A direct current voltage component of the VFB_COMP1 is determined by an output VEA_OUT of an error amplifier. Both the VEA_OUT and the VFB_COMP2 are obtained after the output voltage VO goes through two feedback paths respectively. When the output voltage VO changes, a change amount is transferred to the VFB_COMP1 and the VFB_COMP2, causing waveforms of the VFB_COMP1 and the VFB_COMP2 to also change. As a result, a duty cycle of the PWM output changes.

For example, when the VFB_COMP1 passes through a lower part of the VFB_COMP2, the PWM signal flips to a high level. In this case, correspondingly, the first power transistor PMOS in FIG. 6 is turned on, and the second power transistor NMOS in FIG. 6 is switched off. When the VFB_COMP1 passes through an upper part of the VFB_COMP2, the PWM signal flips to a low level. In this case, correspondingly, the first power transistor PMOS in FIG. 6 is switched off, and the second power transistor NMOS in FIG. 6 is turned on. When the direct current output voltage of the voltage conversion circuit in FIG. 6 is stable, relative positions of the VFB_COMP1 and the VFB_COMP2 do not change, and a frequency of the PWM output signal obtained through comparison between the VFB_COMP1 and the VFB_COMP2 does not change and is determined by a frequency of the VFB_COMP2.

Therefore, it can be learned that the voltage conversion circuit in the foregoing embodiment of this application has a fixed operating frequency.

Besides, the duty cycle of the PWM signal output by the comparator CMP in this embodiment of this application is controlled by the output VEA_OUT of the error amplifier, and the VEA_OUT is used to control the direct current voltage component of the VFB_COMP1. That is, the duty cycle of the PWM signal is controlled by the VFB_COMP1. For example, when the relative positions of the VFB_COMP1 and the VFB_COMP2 change, for example, when the VFB_COMP1 moves up to a position of VFB_COMP1', the PWM signal output by the comparator CMP is adjusted to be a square wave indicated by a dashed line in FIG. 7, as shown in FIG. 7. Therefore, conduction duration and cut-off duration of the first power transistor and the second power transistor are adjusted using a change in the duty cycle of the PWM signal output by the comparator, to ensure that the output voltage tends to be stable. $V_{RAMP}$ in FIG. 7 indicates a peak value of the VFB_COMP1.

In the voltage conversion circuit provided in this embodiment of this application, a gain and a bandwidth of a VFB_COMP1 loop in a hysteresis-mode DC-DC conversion circuit in this application can be adjusted by adjusting a peak-to-peak value of an AC component ripple of the VFB_COMP1, thereby improving a transient response capability of the hysteresis-mode DC-DC conversion circuit. Therefore, the operating frequency of the voltage conversion circuit in this embodiment of this application is easier to increase, thereby implementing a high-frequency, high-transient-performance, hysteresis-mode DC-DC conversion circuit.

Figure 8:
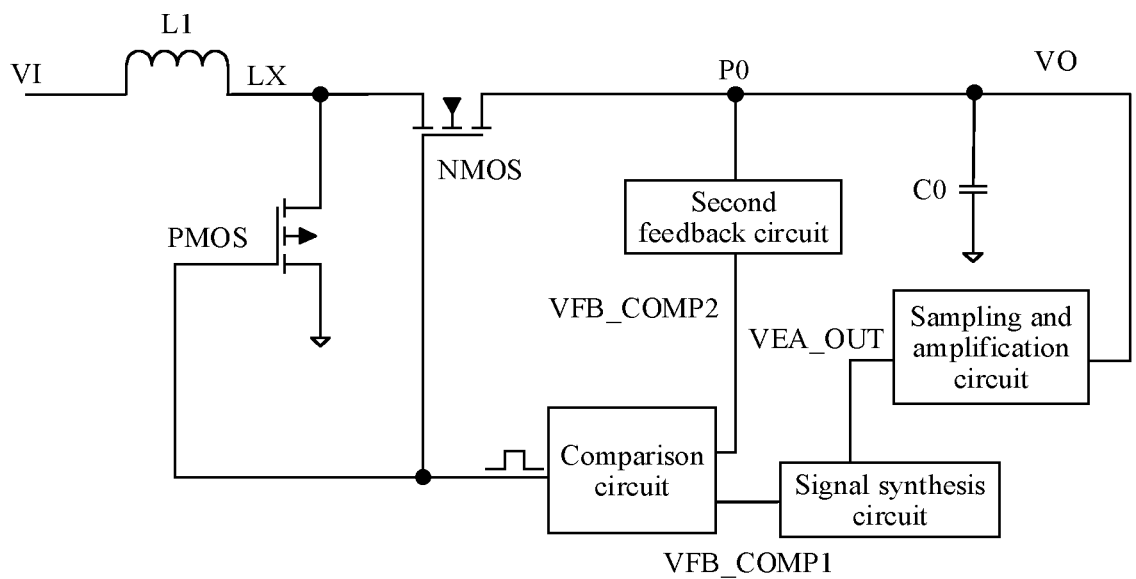
FIG. 8 is a schematic structural diagram of a voltage conversion circuit according to an embodiment of this application.

FIG. 8 is a schematic structural diagram of Embodiment 3 of a voltage conversion circuit according to this application. This embodiment is a specific embodiment in which the voltage conversion circuit shown in FIG. 1 is applied to a boost hysteresis-mode controlled DC-DC converter. The voltage conversion circuit in this embodiment is applied to the boost hysteresis-mode controlled DC-DC converter, and can implement a controllable switching frequency for the hysteresis-mode controlled DC-DC converter, such that an operating frequency of the boost hysteresis-mode controlled DC-DC converter in this embodiment is controllable. Therefore, a load requirement for a fixed frequency can be met, compensation is not required in a hysteresis mode, and a response speed is high. In addition, because the operating frequency is fixed, the voltage conversion circuit in this embodiment can be applied to a multi-phase parallel power system, to enable the multi-phase parallel power system to meet an application scenario of a large load current.

A specific operating manner of the voltage conversion circuit in this embodiment is as follows. A sampling and amplification circuit and a signal synthesis circuit work together to provide a frequency-fixed feedback ripple signal VFB_COMP1. A second feedback circuit provides a second signal VFB_COMP2. After the VFB_COMP1 and the VFB_COMP2 are compared, a frequency-fixed PWM signal is output. When the frequency-fixed PWM signal is at a high level, a first power transistor (PMOS) is turned on, and a second power transistor (NMOS) is switched off. In this case, a direct current input voltage VI stores energy through an inductor (L1), and a capacitor (C0) discharges. Later, when the frequency-fixed PWM signal flips to a low level, the first power transistor (PMOS) is switched off, and the second power transistor (NMOS) is turned on. In this case, the inductor (L1) releases energy through the second power transistor (NMOS), and the inductor (L1) and the direct current input voltage VI charge the capacitor (C0). In other words, a switching frequency of the voltage conversion circuit in this embodiment is controlled using the frequency-fixed PWM signal, thereby converting the input voltage VI into an output voltage VO.

Figure 9:
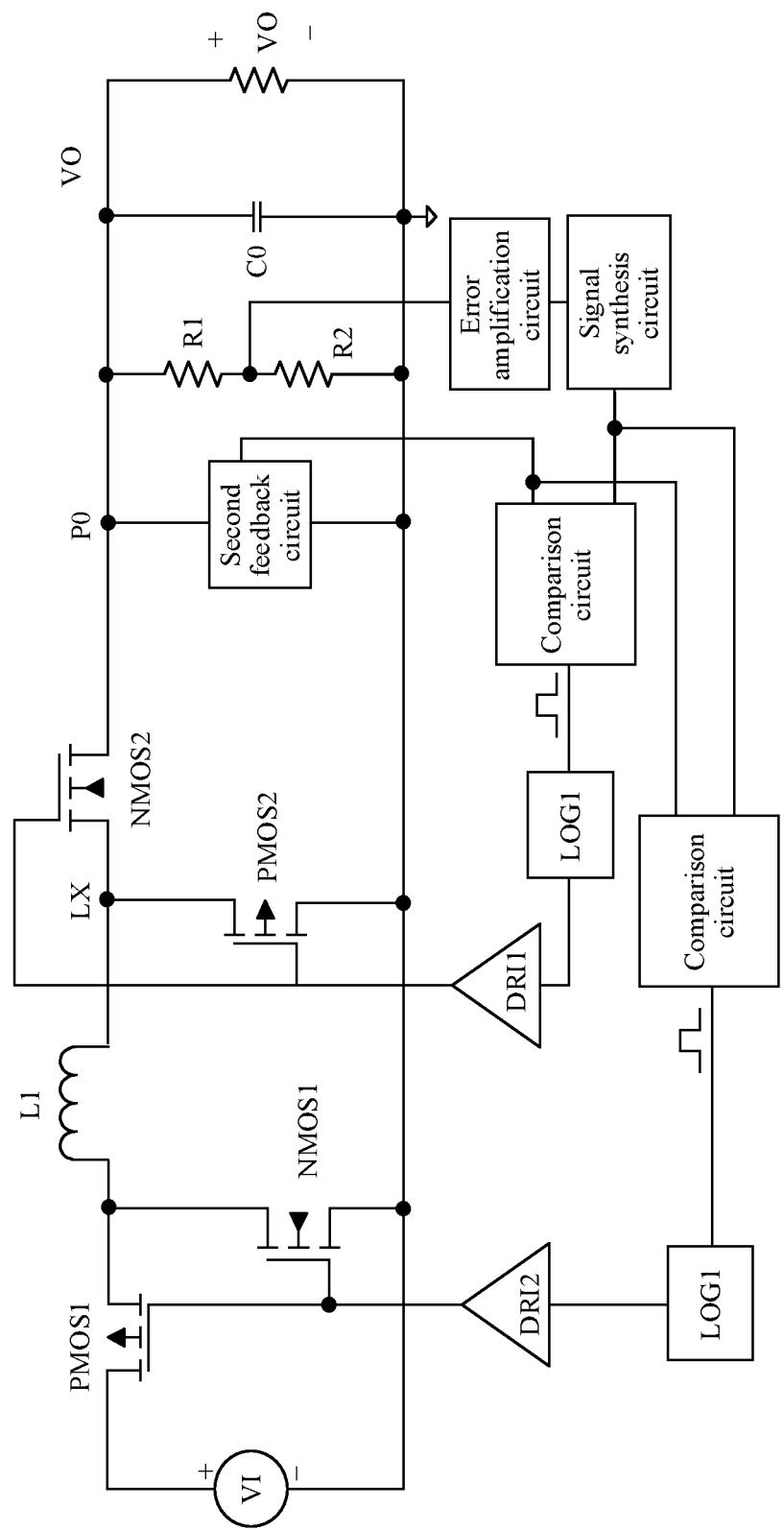
FIG. 9 is a schematic structural diagram of a voltage conversion circuit according to an embodiment of this application.

FIG. 9 is a schematic structural diagram of Embodiment 4 of a voltage conversion circuit according to this application. This embodiment is a specific embodiment in which the voltage conversion circuit shown in FIG. 1 is applied to a buck-boost hysteresis-mode controlled DC-DC converter. The voltage conversion circuit in this embodiment is applied to the buck-boost hysteresis-mode controlled DC-DC converter, and can implement a controllable switching frequency for the hysteresis-mode controlled DC-DC converter, such that an operating frequency of the buck-boost hysteresis-mode controlled DC-DC converter in this embodiment is controllable. Therefore, a load requirement for a fixed frequency can be met, compensation is not required in a hysteresis mode, and a response speed is high. In addition, because the operating frequency is fixed, the voltage conversion circuit in this embodiment can be applied to a multi-phase parallel power system, to enable the multi-phase parallel power system to meet an application scenario of a large load current.

A specific operating manner of the voltage conversion circuit in this embodiment is as follows. A sampling and amplification circuit and a signal synthesis circuit work together to provide a frequency-fixed feedback ripple signal VFB_COMP1. A second feedback circuit provides a second signal VFB_COMP2. After the VFB_COMP1 and the VFB_COMP2 are compared, a frequency-fixed PWM signal is output, to turn on or switch off a first power transistor (PMOS1) and a second power transistor (NMOS1). When the first power transistor (PMOS1) is turned on and the second power transistor (NMOS1) is switched off, the circuit shown in FIG. 9 is a boost circuit. That is, when a third power transistor (PMOS2) is controlled to be turned on and a fourth power transistor (NMOS2) is controlled to be switched off, a direct current input voltage (VIN) stores energy through a first energy storage element (L1), and a second energy storage element (C0) discharges, or when a third power transistor (PMOS2) is controlled to be switched off and a fourth power transistor (NMOS2) is controlled to be turned on, a first energy storage element (L1) releases energy through the fourth power transistor (NMOS2), and the first energy storage element (L1) and the direct current input voltage (VIN) charge a second energy storage element (C0).

When a third power transistor (PMOS2) is switched off and a fourth power transistor (NMOS2) is turned on, the circuit shown in FIG. 9 is a buck circuit. That is, when the first power transistor (PMOS1) is controlled to be turned on and the second power transistor (NMOS1) is controlled to be switched off, a direct current input voltage (VIN) stores energy through the first energy storage element (L1), and charges a second energy storage element (C0), or when the first power transistor (PMOS1) is controlled to be switched off and the second power transistor (NMOS1) is controlled to be turned on, a second energy storage element (C0) discharges, and the first energy storage element (L1) releases energy through the second power transistor (NMOS1).

That is, a switching frequency of the voltage conversion circuit in this embodiment is controlled using the frequency-controllable PWM signal, thereby converting the direct current input voltage VI into a direct current output voltage VO.

Figure 10:
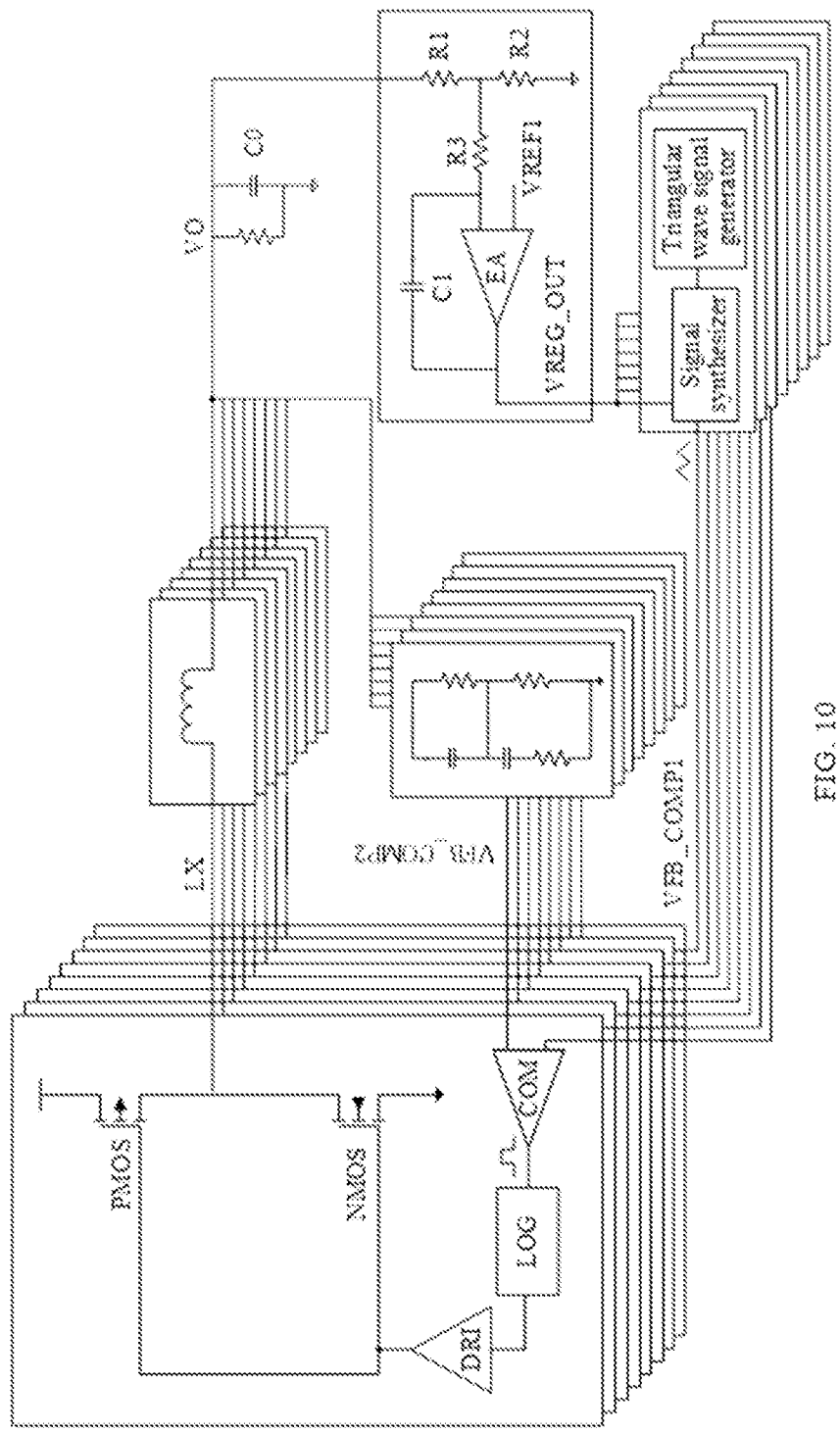
FIG. 10 is a schematic structural diagram of a multi-phase parallel power system according to an embodiment of this application.

FIG. 10 is a schematic structural diagram of a multi-phase parallel power system according to this application. As shown in FIG. 10, the multi-phase parallel power system in this embodiment of this application includes a plurality of voltage conversion circuits shown in FIG. 1. Frequencies of the frequency-controllable triangular wave signals in the voltage conversion circuits are the same, and a difference between adjacent phases of the frequency-controllable triangular wave signals in the voltage conversion circuits is 360° divided by a quantity of the voltage conversion circuits. The voltage conversion circuits share one sampling and amplification circuit.

It should be noted that drive circuits of the voltage conversion circuits are independent of each other, and logic circuits of the voltage conversion circuits are also independent of each other. That is, each voltage conversion circuit respectively uses one drive circuit and one logic circuit.

The voltage conversion circuits have a same input voltage source.

There may be two, three, or more voltage conversion circuits. An example in which there are two voltage conversion circuits is used for description. That is, two voltage conversion circuits in the embodiments of this application are connected in parallel to implement a two-phase parallel power system. In this case, a difference between phases of frequency-fixed triangular wave signals in the two voltage conversion circuits is 180°, and a difference between phases of square waves of PWM outputs in the two voltage conversion circuits is also 180°, that is, a phase difference between VRipple1 and VRipple2 is 180°.

In this embodiment, a plurality of voltage conversion circuits shown in FIG. 1 are applied to a multi-phase parallel structure, thereby meeting an application scenario of a large load current. In addition, equivalent inductance of the multi-phase parallel structure is equal to a single-phase inductance value divided by a quantity of phases, and a switching frequency of the multi-phase parallel structure is equivalent to a single-phase switching frequency multiplied by the quantity of phases, thereby greatly improving a loop response speed for the multi-phase parallel structure.

Figure 11:
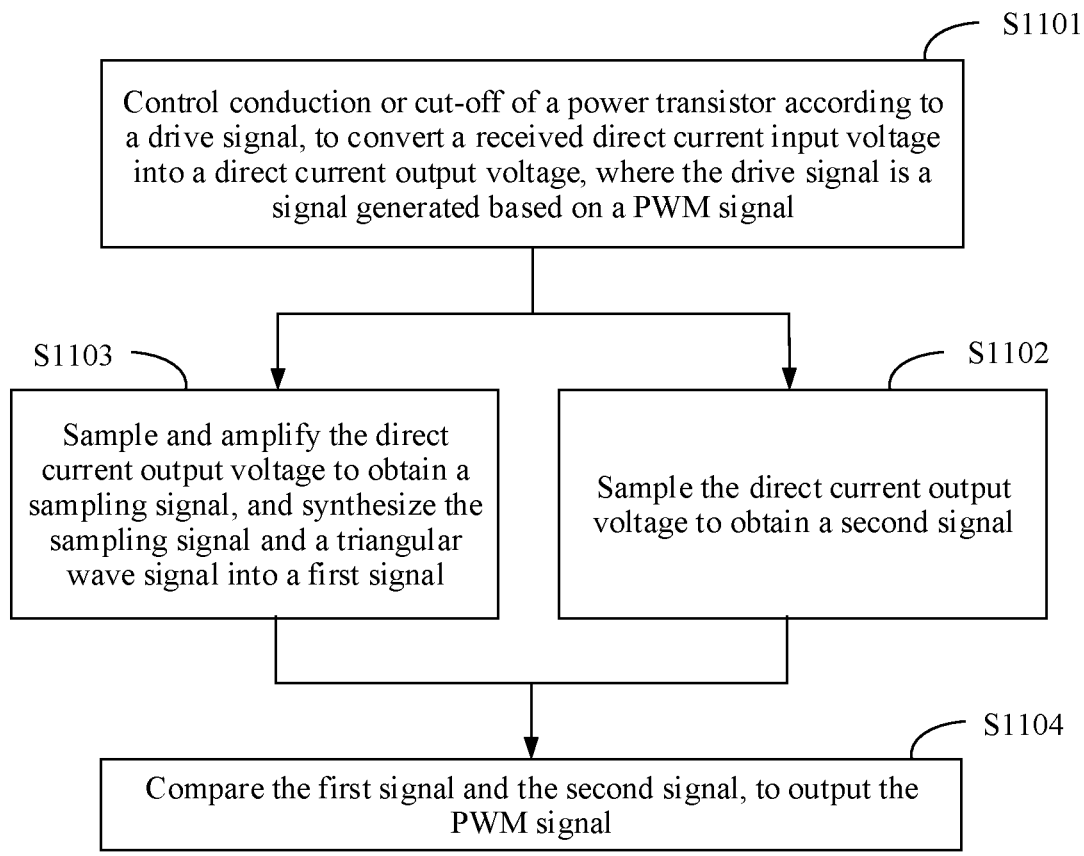
FIG. 11 is a schematic flowchart of a voltage conversion method according to an embodiment of this application.

FIG. 11 is a schematic flowchart of a voltage conversion method according to an embodiment of this application. As shown in FIG. 11, the method may include the following several steps.

S1101: Turn on or switch off a power transistor according to a drive signal, to convert a received direct current input voltage into a direct current output voltage, where the drive signal is a signal generated based on a PWM signal.

S1102: Sample and amplify the direct current output voltage to obtain a sampling signal, and synthesize the sampling signal and a triangular wave signal into a first signal.

S1103: Sample the direct current output voltage to obtain a second signal. S1103 and S1101-S1102 may be performed in any order. In FIG. 11, an example in which S1103 and S1101-S1102 are performed in parallel is used for description.

S1104: Compare the first signal and the second signal, to output the PWM signal.

Optionally, a frequency of the triangular wave signal and a frequency of the PWM signal are controllable, and the first signal is a frequency-controllable feedback ripple signal.

Further, a direct current component of the first signal is controlled by the sampling signal, and the frequency of the triangular wave signal is the same as a frequency of the first signal.

In a feasible embodiment, the sampling and amplifying the direct current output voltage to obtain a sampling signal in S1102 may be performing voltage-dividing sampling on the direct current output voltage to obtain a voltage-dividing sampling signal, and comparing the voltage-dividing sampling signal and a first reference voltage signal, and amplifying a difference signal between the voltage-dividing sampling signal and the first reference voltage signal to obtain the sampling signal.

In a feasible embodiment, synthesizing the sampling signal and a triangular wave signal into a first signal in S1102 may be generating the frequency-controllable triangular wave signal, and synthesizing the sampling signal and the frequency-controllable triangular wave signal into the frequency-controllable feedback ripple signal.

Further, the method further includes comparing the frequency-controllable PWM signal with a preset control logic signal, to obtain a control signal that turns on and switches off the power transistor, and converting the control signal into a drive signal with a driving capability, and using the drive signal to turn on and switch off the power transistor.

Optionally, the power transistor may include a first power transistor and a second power transistor, and turning on and switching off a power transistor may include controlling the second power transistor to be switched off when the first power transistor is turned on, and controlling the second power transistor to be turned on when the first power transistor is switched off. When the first power transistor is turned on and the second power transistor is switched off, the direct current input voltage stores energy through a first energy storage element, and charges a second energy storage element, or when the first power transistor is switched off and the second power transistor is turned on, a second energy storage element discharges, and a first energy storage element releases energy through the second power transistor.

Optionally, the power transistor may include a first power transistor and a second power transistor, and turning on and switching off a power transistor may include controlling the second power transistor to be switched off when the first power transistor is turned on, and controlling the second power transistor to be turned on when the first power transistor is switched off. When the first power transistor is turned on and the second power transistor is switched off, the direct current input voltage stores energy through a first energy storage element, and a second energy storage element discharges, or when the first power transistor is switched off and the second power transistor is turned on, a first energy storage element releases energy through the second power transistor, and the first energy storage element and the direct current input voltage charge a second energy storage element.

Optionally, the power transistor may include a first power transistor, a second power transistor, a third power transistor, and a fourth power transistor, and turning on and switching off a power transistor may include controlling the second power transistor to be switched off when the first power transistor is turned on, controlling the second power transistor to be turned on when the first power transistor is switched off, controlling the fourth power transistor to be switched off when the third power transistor is turned on, and controlling the fourth power transistor to be turned on when the third power transistor is switched off.

In a case in which the first power transistor is turned on and the second power transistor is switched off, when the third power transistor is turned on and the fourth power transistor is switched off, the direct current input voltage stores energy through a first energy storage element, and a second energy storage element discharges, or when the third power transistor is switched off and the fourth power transistor is turned on, a first energy storage element releases energy through the fourth power transistor, and the first energy storage element and the direct current input voltage charge a second energy storage element. In a case in which the third power transistor is switched off and the fourth power transistor is turned on, when the first power transistor is turned on and the second power transistor is switched off, the direct current input voltage stores energy through a first energy storage element, and charges a second energy storage element, or when the first power transistor is switched off and the second power transistor is turned on, a second energy storage element discharges, and a first energy storage element releases energy through the second power transistor.

The method in this embodiment may be used to execute the technical solutions of the method embodiments shown in FIG. 1 to FIG. 10. The implementation principles and technical effects are similar, and are not further described herein.

In the several embodiments provided in this application, it should be understood that the disclosed circuit, system, and method may be implemented in other manners. For example, the described voltage conversion circuit embodiment is merely an example. For example, the division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A voltage conversion circuit for a multi-phase parallel power system comprising:
a plurality of voltage conversion subcircuits, each of the plurality of voltage conversion subcircuits comprising a power transistor and configured to turn on or off the power transistor according to a drive signal to convert a received direct current input voltage into a direct current output voltage, wherein the drive signal is based on a pulse-width modulation (PWM) signal; and
a first feedback circuit comprising:
a sampling and amplification circuit configured to:
sample and amplify the direct current output voltage to obtain a sampling signal; and
output the sampling signal;
a signal synthesis circuit that includes a triangular wave signal generator and a signal synthesizer and that is configured to:
synthesize the sampling signal to produce a frequency adjustable triangular wave signal as a first signal;
wherein the triangle wave signal generator is configured to: generate and produce the frequency-controllable triangular wave signal VRipple into the signal synthesizer; and
output the first signal;
a second feedback circuit configured to:
sample the direct current output voltage to produce and output a second signal that varies in magnitude in response to charging and discharging of the power transistor; and
output the second signal; and
a comparison circuit configured to compare the first signal and the second signal to output the PWM signal, wherein:
the first signal frequency is based on the frequency adjustable triangular wave signal.

2. The voltage conversion circuit of claim 1, wherein a first frequency of the triangular wave signal and a second frequency of the PWM signal are variable frequencies, and wherein the first signal is a frequency-controllable feedback ripple signal.

3. The voltage conversion circuit of claim 1, wherein a direct current component of the first signal is based on the sampling signal, and wherein a first frequency of the triangular wave signal is the same as a third frequency of the first signal.

4. The voltage conversion circuit of claim 1, wherein the sampling and amplification circuit comprises:

a voltage-dividing sampling circuit configured to:
  perform voltage-dividing sampling on the direct current output voltage to obtain a voltage-dividing sampling signal; and
  output the voltage-dividing sampling signal; and
an error amplification circuit configured to:
  obtain the voltage-dividing sampling signal;
  compare the voltage-dividing sampling signal and a first reference voltage signal to obtain a difference signal; and
  amplify the difference signal to obtain the sampling signal.

5. The voltage conversion circuit of claim 4, wherein the voltage-dividing sampling circuit comprises:
  a first resistor coupled to a first output end of the voltage conversion subcircuit; and
  a second resistor coupled between the first resister and a ground terminal, and
wherein the error amplification circuit comprises:
  a first input end;
  a third resistor;
  an error amplifier comprising:
    a second input end coupled to the voltage-dividing sampling circuit through the third resistor;
    a third input end configured to receive the first reference voltage signal; and
    a second output end coupled to the signal synthesis circuit; and
  a first capacitor coupled between the second input end and the second output end.

6. The voltage conversion circuit of claim 3, wherein the signal synthesis circuit comprises:
  a triangular wave signal generator configured to:
    generate the triangular wave signal;
    control the first frequency; and
    output the triangular wave signal; and
  a signal synthesizer configured to:
    obtain the triangular wave signal; and
    synthesize the sampling signal and the triangular wave signal into a frequency-controllable feedback ripple signal.

7. The voltage conversion circuit of claim 1, wherein the resistor-capacitor (RC) compensation circuit is configured to compensate a highest-frequency pole of an energy storage element in the voltage conversion subcircuit.

8. The voltage conversion circuit of claim 7, wherein the RC compensation circuit comprises:
  a second capacitor;
  a fourth resistor, wherein both the second capacitor and the fourth resistor are coupled between a fourth input end of the comparison circuit and a first output end of the voltage conversion subcircuit;
  a third capacitor;
  a fifth resistor coupled between the fourth input end and a ground terminal; and
  a sixth resistor, wherein the third capacitor and the sixth resistor are coupled in series and coupled between the fourth input end and the ground terminal.

9. The voltage conversion circuit of claim 8, wherein the second feedback circuit further comprises:
  a voltage follower comprising:
    a fifth input end; and
    a third output end coupled to a first end of the fourth resistor that is coupled to the first output end;
  a voltage amplification circuit comprising a fourth output end and configured to amplify a preset voltage signal to obtain an amplified voltage signal; and
  a voltage-current conversion circuit comprising:
    a sixth input end coupled to the first output end;
    a fifth output end coupled to the fifth input end;
    a sixth output end coupled to the fourth output end,
  wherein the voltage-current conversion circuit is configured to:
    perform voltage-dividing sampling on the direct current output voltage to obtain a voltage-dividing sampled voltage signal;
    compare the voltage-dividing sampled voltage signal with a second reference voltage signal to obtain a current signal; and
    output a voltage-variable signal according to the current signal, and
  wherein the voltage follower is configured to:
    superimpose the voltage-variable signal and the amplified voltage signal to obtain a third signal; and
    buffer the third signal.

10. The voltage conversion circuit of claim 9, wherein the voltage-current conversion circuit further comprises:
  a seventh resistor comprising:
    a second end; and
    a third end coupled to the first output end;
  an eighth resistor comprising:
    a fourth end; and
    a fifth end coupled to the ground terminal;
  a voltage-current converter comprising:
    a seventh output end coupled to the fifth input end;
    a seventh input end coupled to the second end and the fourth end; and
    an eighth input end configured to input the second reference voltage signal; and
  a ninth resistor, and
wherein the voltage amplifier circuit comprises:
  a tenth resistor;
  a voltage amplifier coupled to the fifth input end through the ninth resistor and comprising:
    a ninth input end configured to input the preset voltage signal;
    an eighth output end;
    a tenth input end coupled to the eighth output end through the tenth resistor; and
  an eleventh resistor coupled between the eighth output end and the ground terminal.

11. The voltage conversion circuit of claim 1, wherein the first feedback circuit further comprises:
  a logic circuit configured to compare the PWM signal with a preset control logic signal to obtain a control signal that turns on and switches off the power transistor; and
  a drive circuit configured to:
    convert the control signal into the drive signal, wherein the drive signal comprises a driving capability; and
    set the drive signal to turn on and switch off the power transistor,
wherein the comparison circuit comprises a ninth output end coupled to the power transistor sequentially through the logic circuit and the drive circuit.

12. A multi-phase parallel power system comprising:
  N voltage conversion circuits, wherein N≥2, wherein first frequencies of triangular wave signals in the N voltage conversion circuits are the same, wherein a phase of an $i^{th}$ voltage conversion circuit of the N voltage conversion circuits is i×360 degrees (°)/N, wherein 1≤i≤N, wherein the N voltage conversion circuits share one sampling and amplification circuit, and wherein each of the N voltage conversion circuits comprises:

a voltage conversion subcircuit comprising a power transistor and configured to turn on or off the power transistor according to a drive signal to convert a received direct current input voltage into a direct current output voltage, wherein the drive signal is based on a pulse-width modulation (PWM) signal; and a first feedback circuit comprising:
  a sampling and amplification circuit configured to:
    sample and amplify the direct current output voltage to obtain a sampling signal; and
    output the sampling signal;
  a signal synthesis circuit that includes a triangular wave signal generator and a signal synthesizer and that is configured to:
    synthesize the sampling signal to produce a frequency adjustable triangular wave signal as a first signal;
    wherein the triangle wave signal generator is configured to: generate and produce the frequency-controllable triangular wave signal VRipple into the signal synthesizer; and
    output the first signal;
  a second feedback circuit configured to:
    sample the direct current output voltage to produce and output a second signal that varies in magnitude in response to charging and discharging of the power transistor; and
    output the second signal; and
  a comparison circuit configured to compare the first signal and the second signal to output the PWM signal, wherein:
    the first signal frequency is based on the frequency adjustable triangular wave signal.

13. The multi-phase parallel power system of claim 12, wherein the first frequencies of the triangular waves signals and a second frequency of the PWM signal are variable frequencies, and wherein the first signal is a frequency-controllable feedback ripple signal.

14. The multi-phase parallel power system of claim 12, wherein a direct current component of the first signal is based on the sampling signal, and wherein each of the first frequencies is the same as a third frequency of the first signal.

15. The multi-phase parallel power system of claim 12, wherein the sampling and amplification circuit comprises:
  a voltage-dividing sampling circuit configured to:
    perform voltage-dividing sampling on the direct current output voltage to obtain a voltage-dividing sampling signal; and
    output the voltage-dividing sampling signal; and
  an error amplification circuit configured to:
    obtain the voltage-dividing sampling signal;
    compare the voltage-dividing sampling signal and a first reference voltage signal to obtain a difference signal; and
    amplify the difference signal to obtain the sampling signal.

16. A method for a multi-phase parallel power system having a plurality of voltage conversion subcircuits, the method for the plurality of voltage conversion subcircuits comprising:
  receiving a drive signal;
  turning on or off a power transistor according to the received drive signal to convert a received direct current input voltage into a direct current output voltage, wherein the received drive signal is based on a pulse-width modulation (PWM) signal;
  sampling and amplifying the direct current output voltage to obtain and output a sampling signal;
  synthesizing the sampling signal and a triangular wave signal and producing a first signal a frequency controllable triangular waveform signal VRipple as a first signal into the signal synthesizer;
  output the first signal;
  sampling the direct current output voltage to obtain produce a second signal; and
  comparing the first signal and the second signal to output the PWM signal wherein
  the first signal frequency is based on the frequency adjustable triangular wave signal.

17. The method of claim 16, wherein a first frequency of the triangular wave signal and a second frequency of the PWM signal are variable frequencies, and wherein the first signal is a frequency-controllable feedback ripple signal.

18. The method of claim 16, wherein a direct current component of the first signal is based on the sampling signal, and wherein a first frequency of the triangular wave signal is the same as a third frequency of the first signal.

19. The method of claim 18, further comprising:
  performing voltage-dividing sampling on the direct current output voltage to obtain a voltage-dividing sampling signal;
  comparing the voltage-dividing sampling signal and a first reference voltage signal to obtain a difference signal; and
  amplifying the difference signal to obtain the sampling signal.

20. The method of claim 17, further comprising:
  generating the triangular wave signal;
  controlling the first frequency; and
  synthesizing the sampling signal and the triangular wave signal into a frequency-controllable feedback ripple signal.

* * * * *